(12) United States Patent
Shang et al.

(10) Patent No.: US 9,408,255 B2
(45) Date of Patent: Aug. 2, 2016

(54) METHOD FOR MIGRATING USER PLANE FROM IUR-G INTERFACE TO A INTERFACE AND CORRESPONDING APPARATUS

(75) Inventors: Lei Shang, Shanghai (CN); Bei Jiang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/544,503

(22) Filed: Jul. 9, 2012

(65) Prior Publication Data
US 2012/0276905 A1 Nov. 1, 2012

Related U.S. Application Data

(63) Continuation of application No. PCT/CN2010/080588, filed on Dec. 31, 2010.

(30) Foreign Application Priority Data

Jan. 8, 2010 (CN) .......................... 2010 1 0042717

(51) Int. Cl.
*H04W 92/04* (2009.01)
*H04W 36/14* (2009.01)
(Continued)

(52) U.S. Cl.
CPC .............. *H04W 92/04* (2013.01); *H04W 36/14* (2013.01); *H04W 92/14* (2013.01); *H04W 92/22* (2013.01)

(58) Field of Classification Search
CPC ... H04L 51/24; H04L 61/157; H04L 65/1016; H04L 67/141; H04L 43/0811; H04L 49/252; H04L 51/14; H04L 61/1582; H04M 3/42059; H04M 1/006; H04M 1/274508; H04W 4/16; H04W 76/02

USPC .......... 455/436, 437–439, 446, 561; 370/331, 370/338
See application file for complete search history.

(56) References Cited

U.S. PATENT DOCUMENTS

| 6,438,370 B1 | 8/2002 | Einola et al. |
| 6,983,159 B2 | 1/2006 | Di Pasquale et al. |

(Continued)

FOREIGN PATENT DOCUMENTS

| CN | 1356818 A | 7/2002 |
| CN | 1423440 A | 6/2003 |

(Continued)

OTHER PUBLICATIONS

International Search Report in corresponding International Patent Application No. PCT/CN2010/080588 (Apr. 7, 2011).

(Continued)

*Primary Examiner* — Kwasi Karikari
(74) *Attorney, Agent, or Firm* — Leydig, Voit & Mayer, Ltd.

(57) ABSTRACT

Embodiments of the present invention disclose a method for migrating a user plane from an Iur-g interface to an A interface and an apparatus. The method includes: receiving, by a BSC, a migration commit notification that is sent by an RNC through an Iur-g interface, where the migration commit notification is sent by the RNC according to a notification message of finishing preparing resources by the BSC, and the notification message of finishing preparing resources by the BSC is sent by a core network; and migrating, by the BSC, a user plane from the Iur-g interface to an A interface according to the migration commit notification. In this way, the interruption duration in a process of migrating the user plane from the Iur-g interface to the A interface may be shortened.

14 Claims, 5 Drawing Sheets

(51) Int. Cl.
*H04W 92/14* (2009.01)
*H04W 92/22* (2009.01)

(56) References Cited

U.S. PATENT DOCUMENTS

| | | | |
|---|---|---|---|
| 7,443,819 B2 | 10/2008 | Hempel et al. | |
| 2002/0160785 A1* | 10/2002 | Ovesjo et al. | 455/453 |
| 2003/0169725 A1* | 9/2003 | Ahmavaara et al. | 370/352 |
| 2005/0075099 A1* | 4/2005 | Guyot | 455/414.1 |
| 2006/0073828 A1* | 4/2006 | Sipila | 455/436 |
| 2006/0172741 A1* | 8/2006 | Jeong et al. | 455/446 |
| 2007/0238461 A1 | 10/2007 | Lundin | |
| 2007/0298800 A1* | 12/2007 | Williams et al. | 455/436 |
| 2008/0095051 A1 | 4/2008 | Kim | |
| 2009/0175240 A1* | 7/2009 | Hayashi | 370/331 |
| 2009/0196213 A1* | 8/2009 | Zhong et al. | 370/312 |
| 2010/0284365 A1* | 11/2010 | Sundell et al. | 370/331 |

FOREIGN PATENT DOCUMENTS

| | | |
|---|---|---|
| CN | 1852549 A | 10/2006 |
| CN | 101147412 A | 3/2008 |
| CN | 101543107 A | 9/2009 |
| CN | 101778440 A | 7/2010 |
| EP | 0544462 A2 | 6/1993 |
| EP | 1715715 A1 | 10/2006 |
| KR | 20040068705 A | 8/2004 |
| WO | WO 02076130 A2 | 9/2002 |
| WO | WO 03103325 A1 | 12/2003 |
| WO | WO 2006030070 A1 | 3/2006 |

OTHER PUBLICATIONS

Written Opinion of the International Searching Authority in corresponding International Patent Application No. PCT/CN2010/080588 (Apr. 7, 2011).

International Search Report in corresponding International Patent Application No. PCT/CN2008/071780 (Nov. 6, 2008).

Written Opinion of the International Searching Authority in corresponding International Patent Application No. PCT/CN2008/071780 (Nov. 6, 2008).

Extended European Search Report in related European Patent Application No. 11007988.6 (Mar. 20, 2012).

Extended European Search Report in corresponding European Patent Application No. 08783773.8 (Feb. 18, 2011).

Rejection Decision in corresponding Japanese Patent Application No. 2010-517260 (Jan. 13, 2012).

"3GPP TS 23.003 V7.4.0—Technical Specification Group Core Network and Terminals; Numbering, Addressing and Identification (Release 7)," Jun. 2007, 3$^{rd}$ Generation Partnership Project, Valbonne, France.

"3GPP TS 23.236 V7.0.0 —Technical Specification Group Services and System Aspects; Intra-Doman Connection of Radio Access Network (RAN) Nodes to Multiple Core Network (CN) Nodes (Release 7)," Dec. 2006, 3$^{rd}$ Generation Partnership Project, Valbonne, France.

"3GPP TS 23.401 V1.0.0—Specification Group Services and System Aspects; GPRS Enhancements for E-UTRAN Access (Release 8)," May 2007, 3$^{rd}$ Generation Partnership Project, Valbonne, France.

"3GPP TSG-RAN WG3 #53—SAE/LTE Identities," Aug. 28, 2006, 3$^{rd}$ Generation Partnership Project, Valbonne, France.

"3GPP TSG SA WG2—Globally Unique Temporary Identities," Nov. 2007, 3$^{rd}$ Generation Partnership Project, Valbonne, France.

"3GPP TSG SA WG2 Meeting #59—Discussion on the Structure of S-TMSI," Aug. 2007, 3$^{rd}$ Generation Partnership Project, Valbonne, France.

European Search Report in corresponding European Patent Application No. 10841995.3 (Jan. 4, 2013).

\* cited by examiner

METHOD FOR MIGRATING USER PLANE FROM IUR-G INTERFACE TO A INTERFACE AND CORRESPONDING APPARATUS

CROSS-REFERENCE TO RELATED APPLICATIONS

This application is a continuation of International Application No. PCT/CN2010/080588, filed on Dec. 31, 2010, which claims priority to Chinese Patent Application No. 201010042717.4, filed on Jan. 8, 2010, the contents of which are all incorporated herein by reference in their entireties.

FIELD OF THE INVENTION

The present invention relates to the field of communications technologies, and in particular, to a method for migrating a user plane from an Iur-g interface to an A interface and a corresponding apparatus.

BACKGROUND OF THE INVENTION

Under circumstances where 2G and 3G networks coexist for a long time, interworking between 2G and 3G frequently occurs. Through the convergence on the access network device side, an Iur-g interface between a base station controller (Base Station controller, BSC) and a radio network controller (Radio Network Controller, RNC) is used to optimize the handover procedure, so that the Iur-g interface bears a signaling plane and a user plane at the same time. In this way, the inter-system handover success rate may be improved.

After an air interface is handed over from 3G to 2G, the RNC may migrate the user plane from the Iur-g interface to the A interface at a proper time, and release Iur-g interface resources. In this way, the user is migrated to 2G completely, and successive handovers are avoided.

Figure 1:
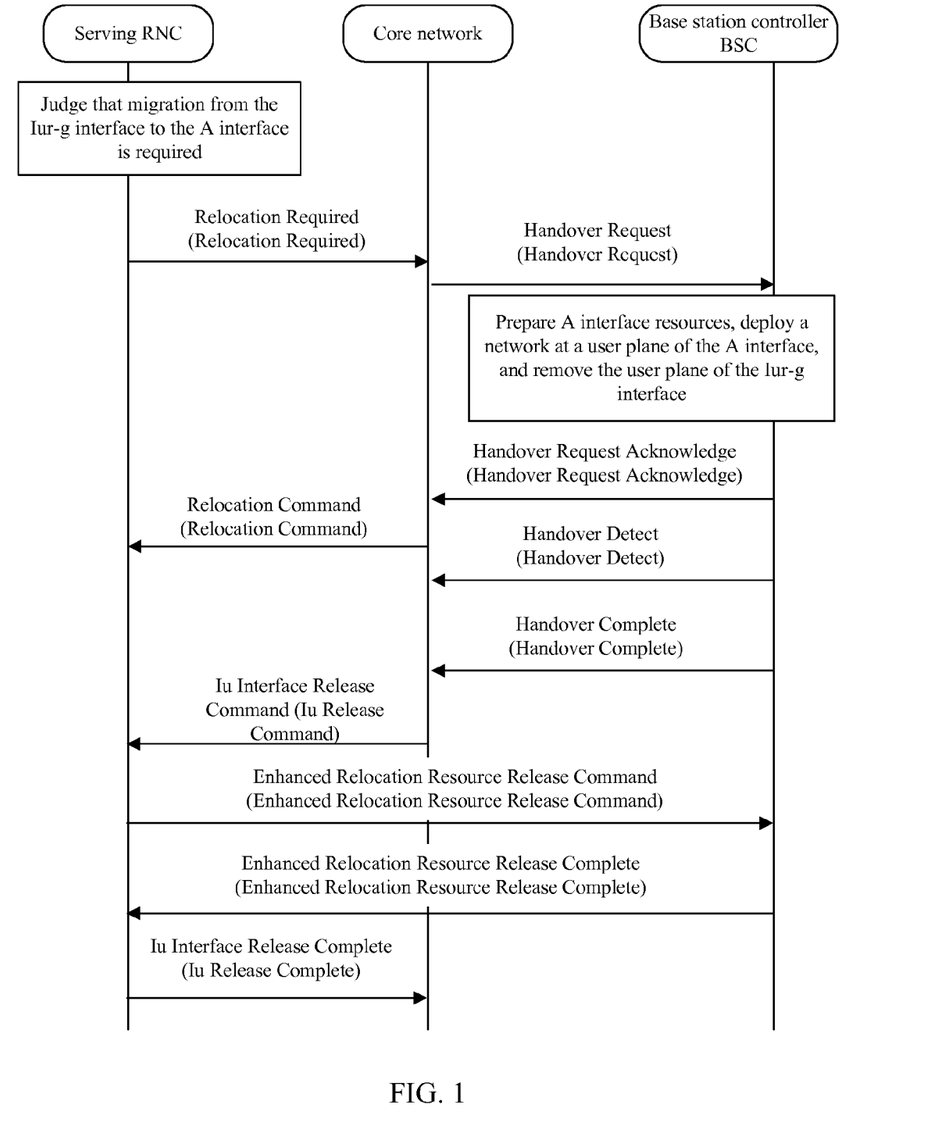
FIG. 1 is a message interaction diagram illustrating a procedure for migrating a user plane from an Iur-g interface to an A interface in the prior art.

Referring to FIG. 1, currently an optional procedure for migrating a user plane from an Iur-g interface to an A interface is as follows:

(1) When a RNC judges that it is required to perform migration from the Iur-g interface to the A interface, a relocation required (Relocation Required) message is sent to a core network.

(2) After the BSC receives a handover request (Handover Request) message sent by the core network, finishes preparing A interface resources, deploys a network at a user plane of the A interface, and removes a user plane of the Iur-g interface, it sends a handover request acknowledge (Handover Request Acknowledge) message, a handover detect (Handover Detect) message, and a handover complete (Handover Complete) message to the core network successively.

(3) After the core network receives the Handover Complete message sent by the BSC, an Iu interface release command (Iu Release Command) message is sent to the RNC, triggering the RNC to release Iur-g interface resources.

The inventor finds that, in the foregoing handover procedure: After the BSC receives a handover request message from the core network, the BSC actively implements a whole process of handing over the user plane from the Iur-g interface to the A interface, which causes a long interruption of the user plane during the handover.

SUMMARY OF THE INVENTION

Embodiments of the present invention provide a method for migrating a user plane from an Iur-g interface to an A interface and a corresponding apparatus.

In one aspect, an embodiment of the present invention provides a method for migrating a user plane from an Iur-g interface to an A interface, including:

receiving, by a BSC, a migration commit notification that is sent by an RNC through the Iur-g interface, where the migration commit notification is sent by the RNC according to a notification message sent by a core network indicating that the BSC has finished preparing resources; and migrating, by the BSC, the user plane from the Iur-g interface to the A interface according to the migration commit notification.

In one aspect, an embodiment of the present invention further provides another method for migrating a user plane from an Iur-g interface to an A interface, including:

after receiving a notification message of finishing preparing resources by a BSC and the notification message of finishing preparing resources by a BSC is sent by a core network, sending, by an RNC, a migration commit notification to the BSC through the Iur-g interface, so that the BSC hands over the user plane from the Iur-g interface to the A interface according to the migration commit notification.

In another aspect, an embodiment of the present invention provides a base station controller, including:

a first receiving unit, configured to receive a migration commit notification that is sent by an RNC through an Iur-g interface, where the migration commit notification is sent by the RNC according to a notification message of finishing preparing resources by the BSC, and the notification message of finishing preparing resources by the BSC is sent by a core network; and a handover unit, configured to migrate a user plane from the Iur-g interface to an A interface according to the migration commit notification.

In another aspect, an embodiment of the present invention provides a radio network controller, including:

a receiving unit, configured to receive a notification message of finishing preparing resources by a base station controller (BSC), and the notification message of finishing preparing resources by the BSC is sent by a core network; and a notifying unit, configured to send a migration commit notification to the BSC through an Iur-g interface after the receiving unit receives the notification message, so that the BSC migrates a user plane from the Iur-g interface to an A interface according to the migration commit notification.

Through the method for migrating the user plane from the Iur-g interface to the A interface and the corresponding apparatus that are provided in the embodiments of the present invention, the BSC receives a migration commit notification that is sent by the RNC through the Iur-g interface, and then deploys a network at the user plane of A interface and removes the user plane of the Iur-g interface. In this way, the interruption duration in a process of migrating the user plane from the Iur-g interface to the A interface may be shortened.

BRIEF DESCRIPTION OF THE DRAWINGS

To make the technical solutions in the embodiments of the present invention clearer, the following briefly introduces the accompanying drawings used in the description of the embodiments.

DETAILED DESCRIPTION OF THE EMBODIMENTS

To make the objectives, technical solutions, and advantages of the present invention clearer, the following describes the technical solutions provided by embodiments of the present invention in detail with reference to the accompanying drawings and exemplary embodiments.

Figure 2:
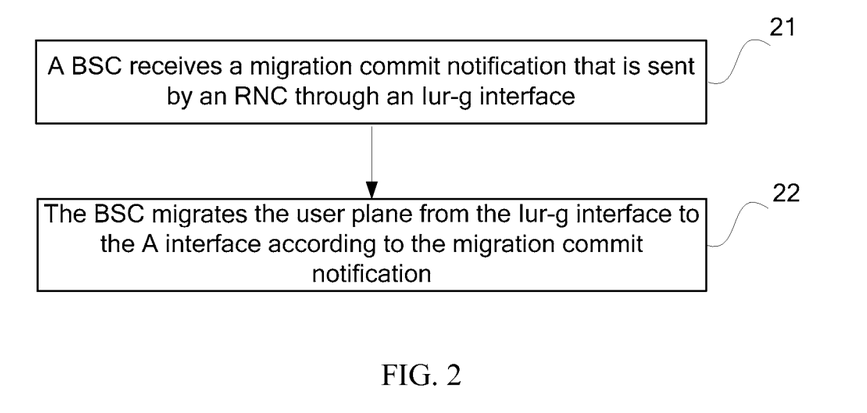
FIG. 2 is a schematic flowchart of a method for migrating a user plane from an Iur-g interface to an A interface according to an embodiment of the present invention.

Referring to FIG. 2, FIG. 2 is a schematic flowchart of a method for migrating a user plane from an Iur-g interface to an A interface according to an embodiment of the present invention. The method includes the following content:

21. A BSC receives a migration commit notification that is sent by an RNC through an Iur-g interface, where the migration commit notification is sent by the RNC according to a notification message of finishing preparing resources by the BSC, and the notification message of finishing preparing resources by the BSC is sent by a core network.

22. The BSC migrates the user plane from the Iur-g interface to the A interface according to the migration commit notification. The migration commit notification in this embodiment of the present invention may be a relocation commit Relocation Commit message, and is used to notify the BSC of migrating the user plane from the Iur-g interface to the A interface. After the BSC parses the migration commit notification and knows the Relocation Commit message, it relocates the user plane from the Iur-g interface to the A interface.

Specifically, it may be that after the RNC receives a notification message of finishing preparing resources by the BSC sent by the core network, the RNC sends the notification message to the BSC, where the notification message of finishing preparing resources by the BSC may be a relocation command message. The migrating, by the BSC, the user plane from the Iur-g interface to the A interface according to a migration commit notification specifically is: deploying a network at the user plane of A interface, and removing the user plane of the Iur-g interface after deployment of the network at the user plane of the A interface is finished.

Through the method for migrating the user plane from the Iur-g interface to the A interface provided in the embodiment of the present invention, the BSC receives a migration commit notification that is sent by the RNC through the Iur-g interface, and then deploys a network at a user plane of the A interface and removes the user plane of the Iur-g interface. Compared with the prior art where the BSC performs the whole handover process of applying for A interface resources, deploying a network at a user plane on the A interface, and removing the user plane of the Iur-g interface immediately after receiving a handover request message from the core network, the method provided in this embodiment may shorten the interruption duration in the process of migrating the user plane from the Iur-g interface to the A interface.

In another embodiment of the present invention, on the basis of the embodiment shown in FIG. 2, before the BSC receives a migration commit notification, the BSC may further receive a handover request sent by the core network, prepare A interface resources according to the handover request, and return a handover request acknowledge message to the core network after finishing preparing A interface resources, so that the core network sends, according to the handover request acknowledge message, a notification message of finishing preparing resources by the BSC to the RNC.

The handover request acknowledge message may be a Handover Request Acknowledge message. The core network receives this message, and it may prepare user plane resources, and then send a notification message of preparing resources by the BSC to the RNC, where the notification message may be a relocation command Relocation Command message. After receiving the notification message, the RNC sends a migration commit notification to the BSC.

In addition, after receiving the migration commit notification and before migrating the user plane from the Iur-g interface to the A interface, the BSC sends a handover detect message to the core network, so as to notify the core network that the BSC detects a user accessing the area controlled by the BSC. The handover detect message may be a Handover Detect message.

After finishing migrating the user plane from the Iur-g interface to the A interface, the BSC may send a handover complete Handover Complete message to the core network.

In this embodiment, the BSC returns a handover request acknowledge message to the core network after finishing preparing A interface resources according to the handover request sent by the core network; sends a handover detect message to the core network after receiving a migration commit notification and before migrating the user plane from the Iur-g interface to the A interface; and sends a handover complete message to the core network after finishing migrating the user plane from the Iur-g interface to the A interface. Different from the prior art where the BSC sends a handover request acknowledge message, a handover detect message, and a handover complete message to the core network successively, the method provided in this embodiment meets the requirement of the core network for a time sequence of messages. In a scenario where the BSC and the RNC do not share one core network, the core network may obtain a user number from a visitor location register (VLR) after receiving a Handover Request Acknowledge message, and then send a relocation command Relocation Command message to the RNC. In this way, the core network does not consider that the relocation fails due to an error when the core network receives a Handover Detect message or a Handover Complete message in the process. Moreover, after the RNC sends a relocation required message to the core network, when the RNC finds that a rollback operation needs to be performed in the migration process, it may also not send a migration commit notification to the BSC, but sends a rollback request to the core network. In this case, the core network does not consider that an error occurs because it does not receive a Handover Complete message, and it may perform the rollback operation.

Figure 3:
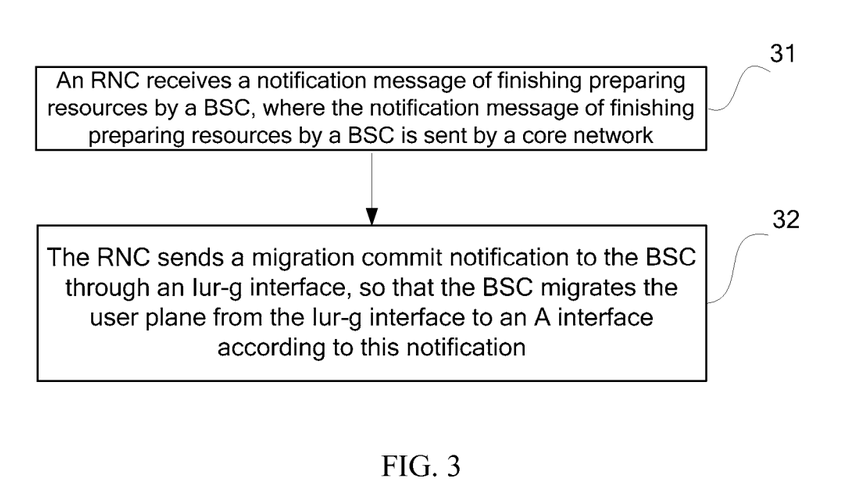
FIG. 3 is another schematic flowchart of a method for migrating a user plane from an Iur-g interface to an A interface according to an embodiment of the present invention.

FIG. 3 is another schematic flowchart of a method for migrating a user plane from an Iur-g interface to an A interface according to an embodiment of the present invention, including the following:

31. An RNC receives a notification message of finishing preparing resources by a BSC, and the notification message of finishing preparing resources by the BSC is sent by a core network.

32. The RNC sends a migration commit notification to the BSC through an Iur-g interface, so that the BSC migrates the user plane from the Iur-g interface to an A interface according to the migration commit notification.

It may be that when the RNC determines that the user plane needs to be migrated from the Iur-g interface to the A interface, the RNC sends a relocation required message to the core network, and the core network requests the BSC to prepare resources according to the relocation required message. Specifically, it may be that the core network sends a handover request Handover Request message to the BSC; after receiving the message, the BSC prepares A interface resources, and returns a handover request acknowledge message to the core network after finishing preparing A interface resources; the core network then sends a notification message of finishing preparing resources by the BSC to the RNC, where the notification message may be a relocation command Relocation Command message; after receiving the notification message of finishing preparing resources by the BSC, the RNC sends a migration commit notification to the BSC through the Iur-g interface, where the migration commit notification may be a relocation commit Relocation Commit message; after receiving the message, the BSC deploys a network at a user plane of the A interface and removes the user plane of the Iur-g interface.

In this embodiment of the present invention, the RNC sends a migration commit notification to the BSC according to a notification message of finishing preparing resources by the BSC. In this way, the whole process in which the BSC actively hands over the user plane from the Iur-g interface to the A interface according to the handover request message sent by the core network is avoided, and the interruption duration in the process of migrating the user plane from the Iur-g interface to the A interface is shortened.

In addition, in another embodiment of the present invention, on the basis of the embodiment shown in FIG. 3, the RNC may further release the Iur-g interface resources according to a release command sent by the core network. The release command may be an Iu interface release command message. After receiving a handover complete message sent by the BSC, the core network sends a release command to the RNC; after receiving the Iu interface release command message sent by the core network, the RNC releases resources of the user plane and signaling plane of the Iu interface and the Iur-g interface on the RNC side, and sends an enhanced relocation resource release command (Enhanced Relocation Resource Release Command) message to the BSC; the BSC releases the signaling plane of the Iur-g interface according to this message, and then returns an enhanced relocation resource release complete (Enhanced Relocation Resource Release Complete) message to the RNC; the RNC receives the enhanced relocation resource release complete message returned from the BSC, and returns an Iu interface release complete (Iu Release Complete) message to the core network. Thereby, the Iur-g interface resources are released completely.

Figure 4:
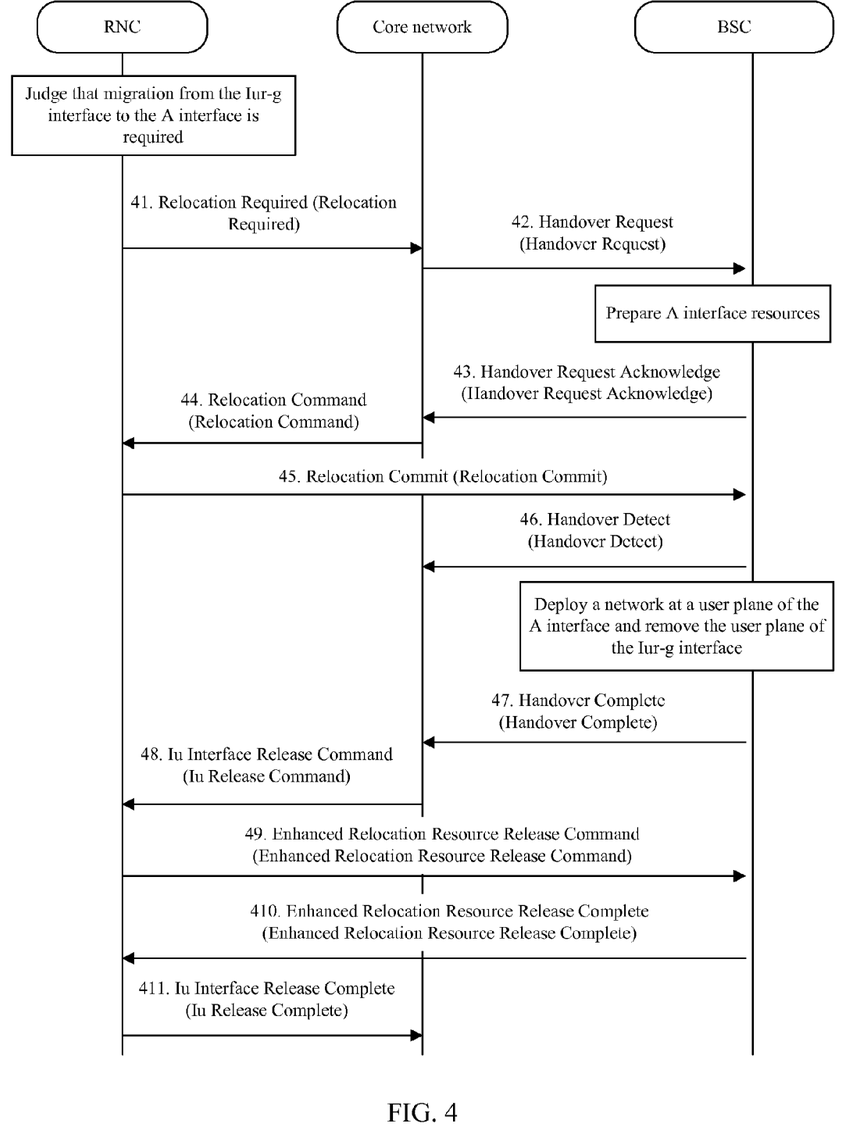
FIG. 4 is a signaling interaction diagram of a method for migrating a user plane from an Iur-g interface to an A interface according to an embodiment of the present invention.

Referring to FIG. 4, FIG. 4 is a signaling interaction diagram of a method for migrating a user plane from an Iur-g interface to an A interface according to an embodiment of the present invention, including the following:

41. After an RNC determines that a user plane needs to be migrated from an Iur-g interface to an A interface, the RNC sends a relocation required (Relocation Required) message to a core network.

42. The core network sends a handover request (Handover Request) message to a BSC.

The BSC receives the handover request message, and applies for A interface resources.

43. After the BSC has finished preparing A interface resources, the BSC returns a handover request acknowledge (Handover Request Acknowledge) message to the core network.

44. The core network sends a relocation command (Relocation Command) message to the RNC, notifying the RNC that the BSC has finished preparing A interface resources.

In a scenario where the BSC and the RNC do not share one core network, the core network may obtain a user number from a visitor location register (VLR) after receiving a handover request acknowledge message, and then send a relocation command Relocation Command message to the RNC.

45. The RNC sends a relocation commit (Relocation Commit) message to the BSC, notifying the BSC that the user plane may be migrated from the Iur-g interface to the A interface.

46. The BSC returns a handover detect (Handover Detect) message to the core network, indicating that a user is detected to access the area controlled by the BSC.

Then, the BSC deploys a network at a user plane of the A interface and removes a user plane of the Iur-g interface.

It should be noted that, 46 may also not be performed. After the BSC receives the relocation commit message, the BSC directly deploys a network at the user plane of the A interface and removes the user plane of the Iur-g interface.

47. After the BSC finishes deploying a network at the user plane of the A interface and removing the user plane of the Iur-g interface, the BSC returns a handover complete (Handover Complete) message to the core network.

Step 48: The core network sends an Iu interface release command (Iu Release Command) message to the RNC, notifying the RNC of releasing the user plane and signaling plane resources of the Iu interface and the Iur-g interface.

49. The RNC sends an enhanced relocation resource release command (Enhanced Relocation Resource Release Command) message to the BSC.

The BSC releases a signaling plane link on the Iur-g interface according to the release command.

410. The BSC returns an enhanced relocation resource release complete (Enhanced Relocation Resource Release Complete) message to the RNC.

411. The RNC returns an Iu release complete (Iu Release Complete) message to the core network. Specifically, after the RNC releases the user plane and signaling plane resources of the Iu interface and the Iur-g interface, the RNC returns the Iu release complete message in 411 to the core network.

It should be noted that, the message processing in step 410 is mutually independent of the message processing in step 411, and there is no particular order between these two steps. Also, there is no particular order between the releasing, by the RNC, the user plane and signaling plane resources of the Iu interface and the user plane and the releasing, by the RNC, the signaling plane resources of the Iur-g interface.

In this embodiment, the BSC migrates the user plane from the Iur-g interface to the A interface according to the relocation commit message sent by the RNC, and sends a handover request acknowledge message, a handover detect message, and a handover complete message to the core network according to different time in the handover process. In this way, the requirement of the core network for a time sequence of messages is met, and the interruption duration of the user plane in the handover process is shortened.

In this embodiment, when the RNC finds that a rollback operation needs to be performed in the migration process, it may also not send a migration commit notification to the BSC, that is, 45 is not performed, but sends a rollback request to the core network. In this case, the core network does not consider that an error occurs because it does not receive a Handover Complete message, and it may perform the Cancel operation.

On the basis of the foregoing method embodiments of the present invention, an embodiment of the present invention provides a base station controller and a radio network controller.

Figure 5:
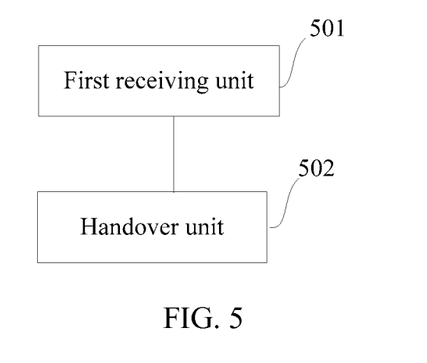
FIG. 5 is a schematic structural diagram of a base station controller according to an embodiment of the present invention.

FIG. 5 is a schematic structural diagram of a base station controller according to an embodiment of the present invention, including the following:

A first receiving unit 501 is configured to receive a migration commit notification that is sent by an RNC through an Iur-g interface, where the relocation commit notification is sent by the RNC according to a notification message of finishing preparing resources by a BSC, and the notification message of finishing preparing resources by the BSC is sent by a core network;

Specifically, the migration commit notification may be a relocation commit Relocation Commit message, and is used to notify the BSC of migrating the user plane from the Iur-g interface to the A interface. The notification message of finishing preparing resources by the BSC may be a relocation command Relocation Command message, where the notification message of finishing preparing resources by the BSC is sent by a core network.

A handover unit 502 is configured to migrate the user plane from the Iur-g interface to the A interface according to the migration commit notification.

Specifically, a network at a user plane of the A interface is deployed, and the user plane of the Iur-g interface is removed after deployment of the network at the user plane of the A interface is finished.

The base station controller provided in this embodiment of the present invention receives a migration commit notification that is sent by the RNC through the Iur-g interface, and then deploys a network at a user plane of the A interface and removes the user plane of the Iur-g interface. In this way, the interruption duration in the process of migrating the user plane from the Iur-g interface to the A interface may be shortened.

Figure 6:
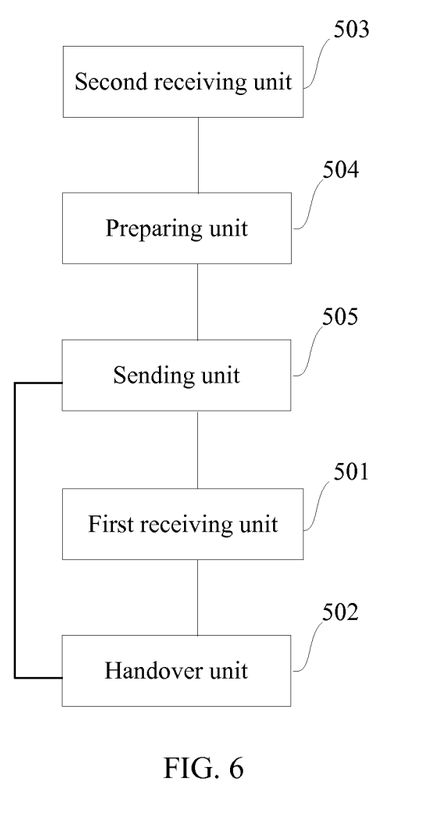
FIG. 6 is another schematic structural diagram of a base station controller according to an embodiment of the present invention.

As shown in FIG. 6, the base station controller shown in FIG. 5 may further include:

a second receiving unit 503, configured to receive a handover request sent by the core network before the first receiving unit 501 receives the migration commit notification;

a preparing unit 504, configured to prepare A interface resources according to the handover request received by the second receiving unit 503; and a sending unit 505, configured to return a handover request acknowledge message to the core network after the preparing unit 504 finishes preparing A interface resources, so that the core network sends a relocation command to the RNC according to the handover request acknowledge message.

The handover request acknowledge message may be a Handover Request Acknowledge message. The core network receives this message, and it may prepare user plane resources, and then send a notification message of finishing preparing resources by the BSC to the RNC, where the notification message may be a relocation command Relocation Command message. After receiving the notification message, the RNC sends a migration commit notification to the BSC.

In another embodiment of the present invention, the sending unit 505 is further configured to send a handover complete message to the core network after the handover unit 502 finishes migrating the user plane from the Iur-g interface to the A interface.

In another embodiment of the present invention, the sending unit 505 may further be configured to send a handover detect message to the core network to notify the core network that a user is detected to access the area controlled by the BSC after the first receiving unit 501 receives the migration commit notification and before the handover unit migrates the user plane from the Iur-g interface to the A interface.

Specifically, after the first receiving unit 501 receives the Relocation Commit notification, the sending unit 505 may send a handover detect message to notify the core network that a user is detected to access the area controlled by the BSC. The handover detect message may be a Handover Detect message.

The base station controller provided in the embodiment shown in FIG. 6 may implement that a handover request acknowledge message, a handover detect message, and a handover complete message are sent to the core network respectively according to different phases in the handover process. In this way, the requirement of the core network for a time sequence of messages is met.

Figure 7:
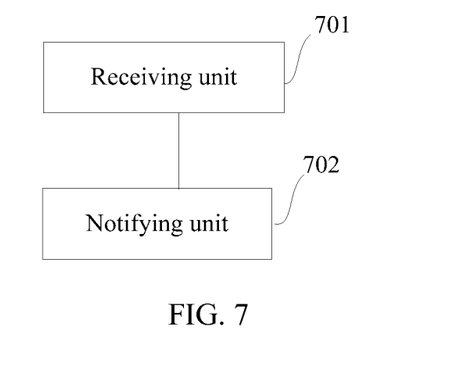
FIG. 7 is a schematic structural diagram of a radio network controller according to an embodiment of the present invention.

Referring to FIG. 7, FIG. 7 is a schematic structural diagram of a radio network controller according to an embodiment of the present invention, including the following.

A receiving unit 701 is configured to receive a notification message of finishing preparing resources by the BSC, where the notification message of finishing preparing resources by the BSC is sent by a core network.

The notification message may be a relocation command Relocation Command message.

A notifying unit 702 is configured to send a migration commit notification to the BSC through an Iur-g interface after the receiving unit receives the notification message, so that the BSC migrates a user plane from the Iur-g interface to an A interface according to the migration commit notification.

The migration commit notification may be a relocation commit Relocation Commit message.

Figure 8:
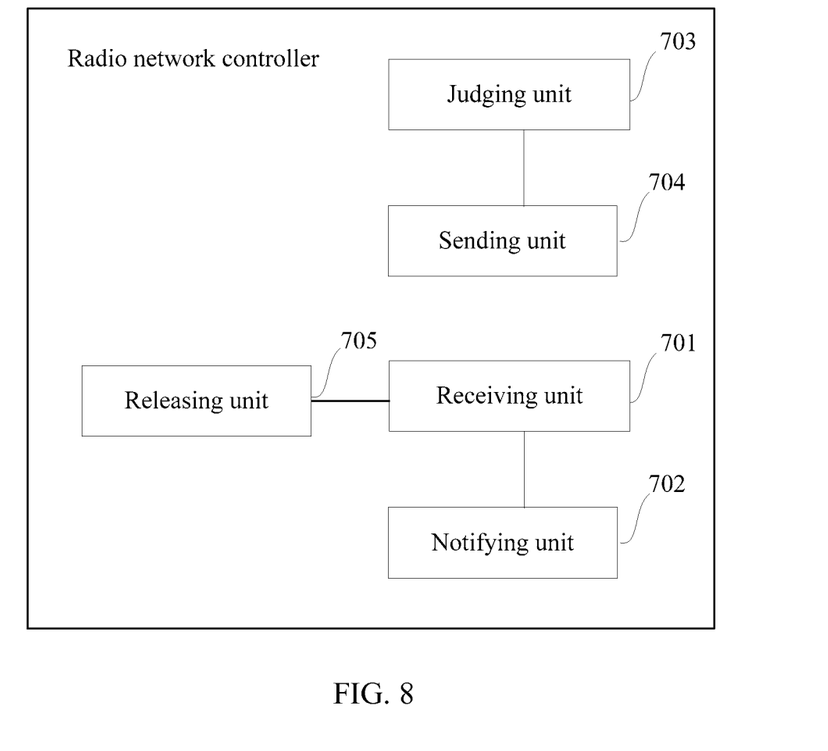
FIG. 8 is another schematic structural diagram of a radio network controller according to an embodiment of the present invention.

As shown in FIG. 8, the foregoing base station controller may further include a judging unit 703, which is configured to judge, before the receiving unit receives the notification message, whether the user plane needs to be migrated from the Iur-g interface to the A interface; and a sending unit 704, configured to send a relocation required message to the core network when the judging unit 703 judges that the user plane needs to be migrated from the Iur-g interface to the A interface, so that the core network requests the BSC to prepare resources according to the migration required message.

Specifically, it may be that the core network sends a handover request Handover Request message to the BSC; after receiving the this message, the BSC prepares A interface resources, and returns a handover request acknowledge message to the core network after finishing preparing A interface resources; the core network sends a notification message of finishing preparing resources by the BSC to the RNC, where the notification message may be a relocation command Relocation Command message; after the receiving unit 701 receives the notification message sent by the core network of finishing preparing resources by the BSC, the notifying unit 702 then sends a migration commit notification to the BSC through the Iur-g interface, where the migration commit notification may be a relocation commit Relocation Commit message; after receiving this message, the BSC deploys a network at a user plane of the A interface and removes the user plane of the Iur-g interface.

In addition, in another embodiment of the present invention, the foregoing radio network controller may further include a releasing unit 705, which is configured to release the user plane and signaling plane resources of the Iu interface and the Iur-g interface according to the release command sent by the core network. The release command may be an Iu interface release command message.

The radio network controller provided in this embodiment of the present invention sends a migration commit notification to the BSC according to a notification message of finishing preparing resources by the BSC, where the notification message of finishing preparing resources by the BSC is sent by the core network. In this way, the whole process in which the BSC actively migrates the user plane from the Iur-g interface to the A interface according to the handover request message sent by the core network is avoided, and the interruption duration in the process of migrating the user plane from the Iur-g interface to the A interface is shortened.

The core network mentioned in the embodiments of the present invention specifically may be a mobile switching center (MSCMobile Switching Center) on a core network, and the radio network controller may be a serving radio network controller.

Finally, it should be noted that, persons of ordinary skill in the art may understand that all or a part of the steps of the method according to the embodiments may be implemented by a program instructing relevant hardware. The program may be stored in a computer readable storage medium. When the program is run, the steps of the method according to the embodiments are performed. The storage medium may be a magnetic disk, an optical disk, a read-only memory (Read-Only Memory, ROM), or a random access memory (Random Access Memory, RAM), and so on.

The foregoing specific embodiments are not intended to limit the present invention, and all modifications, equivalent replacements, and improvements made to the present invention by persons of ordinary skill in the art without departing from the principle of the present invention shall fall within the protection scope of the present invention.

What is claimed is:

1. A method for migrating a user plane from an Iur-g interface to an A interface during a handover from a 3G network to a 2G network, comprising:
   receiving, by a base station controller (BSC), a migration commit notification that is sent by a radio network controller (RNC) through the Iur-g interface between the BSC and the RNC;
   configuring, by the BSC, the user plane of the A interface;
   removing, by the BSC, the user plane of the Iur-g interface between the BSC and the RNC after the configuration of the user plane of the A interface is finished according to the migration commit notification;
   receiving, by the BSC, an enhanced relocation resource release command message from the RNC;
   releasing, by the BSC, signaling plane link on the Iur-g interface according to the enhanced relocation resource release command; and
   returning, by the BSC, an enhanced relocation resource release complete message to the RNC.

2. The method according to claim 1, wherein the migration commit notification is sent by the RNC according to a notification message of finishing preparing resources by the BSC, and the notification message of finishing preparing resources by the BSC is sent by a core network.

3. The method according to claim 1, wherein the method further comprises:
   before receiving the migration commit notification, receiving, by the BSC, a handover request sent by the core network, preparing A interface resources according to the handover request, and after finishing preparing the A interface resources, returning a Handover Request Acknowledge message to the core network, so that the core network sends the notification message of finishing preparing the A interface resources by the BSC to the RNC according to the handover request acknowledge message.

4. The method according to claim 1, wherein the method further comprises: after finishing migrating the user plane from the Iur-g interface to the A interface, sending, by the BSC, a handover complete message to the core network.

5. The method according to claim 2, wherein the method further comprises:
   after receiving the migration commit notification and before migrating the user plane from the Iur-g interface to the A interface, sending, by the BSC, a handover detect message to the core network to notify the core network that a user is detected to access an area controlled by the BSC.

6. A method for migrating a user plane from an Iur-g interface to an A interface during a handover from a 3G network to a 2G network, comprising:
   when judging that the user plane needs to be handed over from the Iur-g interface to the A interface, sending, by a radio network controller (RNC), a relocation required message to a core network, so that the core network requests a base station controller (BSC) to prepare resources according to the relocation required message;
   sending, by the RNC, a migration commit notification to the BSC through the Iur-g interface, so that the BSC configures the user plane of the A interface, and removes the user plane of the Iur-g interface between the BSC and the RNC after the configuration of the user plane of the A interface is finished according to the migration commit notification;
   sending, by the RNC, an enhanced relocation resource release command message to the BSC; and
   receiving, by the RNC, an enhanced relocation resource release complete message to from the BSC, after signaling plane link on the Iur-g interface being released by the BSC according to the enhanced relocation resource release command.

7. The method according to claim 6, wherein that the process of sending by the RNC the migration commit notification to the BSC through the Iur-g interface is performed after the RNC a notification message of finishing preparing the resources by the BSC, wherein the notification message of finishing preparing the resources by the BSC is sent by the core network.

8. A base station controller (BSC), comprising:
   a receiver, configured to receive a migration commit notification that is sent by a radio network controller (RNC) through an Iur-g interface;
   a processor, configured to configure a user plane of an A interface, and remove the user plane of the Iur-g interface between the BSC and the RNC after the configuration of the user plane of the A interface is finished according to the migration commit notification;

wherein the receiver is further configured to receive an enhanced relocation resource release command message from the RNC; and the processor is further configured to release signaling plane link on the Iur-g interface according to the enhanced relocation resource release command;

and the BSC further comprises a sender, configured to return an enhanced relocation resource release complete message to the RNC.

9. The base station controller according to claim 8, wherein the migration commit notification is sent by the RNC according to a notification message of finishing preparing resources by the BSC, and the notification message of finishing preparing the resources by the BSC is sent by a core network.

10. The base station controller according to claim 8, wherein:

the receiver is further configured to receive a handover request sent by the core network before the first receiving unit receives the migration commit notification;

the processor is further configured to prepare A interface resources according to the handover request received by the second receiving unit; and the sender is further configured to return a handover request acknowledge message to the core network after the preparing unit prepares the A interface resources, so that the core network sends a relocation command to the RNC according to the handover request acknowledge message.

11. The base station controller according to claim 10, wherein the sender is further configured to send a handover complete message to the core network after the handover unit finishes migrating the user plane from the Iur-g interface to the A interface.

12. The base station controller according to claim 10, wherein:

the sender is further configured to send a handover detect message to the core network to notify the core network that a user is detected to access an area controlled by the BSC, after the receiving unit receives the migration commit notification and before the handover unit migrates the user plane from the Iur-g interface to the A interface.

13. The radio network controller according to claim 10, the receiver is further configured to, before the sender sends the migration commit notification to the BSC, receive a notification message of finishing preparing the resources by the BSC, wherein the notification message of finishing preparing the resources by the BSC is sent by the core network.

14. A radio network controller (RNC) comprising:

a processor, configured to judge whether a user plane needs to be migrated from an Iur-g interface to an A interface before a receiving unit receives a notification message;

a sender, configured to send a relocation required message to a core network when the judging unit judges that the user plane needs to be migrated from the Iur-g interface to the A interface, so that the core network requests a base station controller (BSC) to prepare resources according to the relocation required message, and to send the migration commit notification to the BSC through the Iur-g interface, so that the BSC configures the user plane of the A interface, and removes the user plane of the Iur-g interface between the BSC and the RNC after the configuration of the user plane of the A interface is finished according to the migration commit notification;

wherein the sender is further configured to send an enhanced relocation resource release command message to the BSC;

and the RNC further comprises a receiver, configured to receive an enhanced relocation resource release complete message to from the BSC, after signaling plane link on the Iur-g interface being released by the BSC according to the enhanced relocation resource release command.

* * * * *